United States Patent
Hsieh

(10) Patent No.: US 9,198,249 B1
(45) Date of Patent: Nov. 24, 2015

(54) LIGHTING SYSTEM INCLUDING A DRIVING DEVICE FOR DRIVING A LIGHTING APPLIANCE

(71) Applicant: Habitex Corporation, Taipei (TW)

(72) Inventor: Pei Lin Hsieh, Taipei (TW)

(73) Assignee: Habitex Corporation, Taipei (TW)

( * ) Notice: Subject to any disclaimer, the term of this patent is extended or adjusted under 35 U.S.C. 154(b) by 43 days.

(21) Appl. No.: 14/309,173

(22) Filed: Jun. 19, 2014

(51) Int. Cl.
H05B 41/36 (2006.01)
H05B 33/08 (2006.01)

(52) U.S. Cl.
CPC .......... *H05B 33/0845* (2013.01); *H05B 33/083* (2013.01); *H05B 33/0812* (2013.01); *H05B 33/0887* (2013.01)

(58) Field of Classification Search
USPC ...... 315/185 R, 186, 193, 200 R, 201, 209 R, 315/210, 224, 246, 250, 291, 297, 307, 312, 315/361, 362
See application file for complete search history.

(56) References Cited

U.S. PATENT DOCUMENTS

| | | | |
|---|---|---|---|
| 2014/0103838 A1* | 4/2014 | Zheng ................ | H05B 33/0815 315/307 |
| 2014/0320031 A1* | 10/2014 | Wu ..................... | H05B 33/0812 315/193 |
| 2014/0333228 A1* | 11/2014 | Angeles ............. | H05B 33/0815 315/291 |

* cited by examiner

*Primary Examiner* — Douglas W Owens
*Assistant Examiner* — Jianzi Chen
(74) *Attorney, Agent, or Firm* — John A. Fortkort; Fortkort & Houston P.C.

(57) ABSTRACT

A driving device of a lighting system includes a rectifier circuit, a voltage reducing circuit, a dimmer circuit, and a driver module. The rectifier circuit outputs a pulsating direct current voltage. The voltage reducing circuit is operable to output a reduced direct current voltage associated with the pulsating direct current voltage. The dimmer circuit generates a dimmer signal based on detected occurrence of an interruption to the pulsating direct current voltage. Based on the dimmer signal, the driver module generates a pulse width modulated signal for driving a lighting appliance to generate light with an intensity corresponding to the dimmer signal.

16 Claims, 4 Drawing Sheets

LIGHTING SYSTEM INCLUDING A DRIVING DEVICE FOR DRIVING A LIGHTING APPLIANCE

BACKGROUND OF THE INVENTION

1. Field of the Invention

The present invention relates to a lighting system including a driving device for driving a lighting appliance, such as a light emitting diode tube lamp.

2. Description of the Related Art

Referring to FIG. 1, a conventional driving circuit 1 for a light emitting diode tube lamp first reduces a voltage of an input alternating current voltage signal (such as AC 110v) using a transformer 10. The alternating current voltage signal is then rectified using a rectifier circuit 11 into a direct current voltage signal. The power factor of the direct current voltage signal is then corrected using a power factor correction circuit (PFC) before the direct current voltage signal is outputted to a light emitting diode tube lamp having light emitting diodes D electrically connected in series. However, the weight and dimensions of the transformer 10 in the conventional driving circuit 1 are not easily reduced. Moreover, an electrolytic solution in an electrolytic capacitor C in the power factor correction circuit 12 may dry up after a certain period, thus affecting the lifespan of the conventional driving circuit 1.

SUMMARY OF THE INVENTION

The object of the present invention is to provide a lighting system that is compact, reliable and reduced in weight.

According to one aspect of the present invention, a lighting system comprises a lighting appliance, and a driving device that includes:

a rectifier circuit operable to rectify an input alternating current signal and to output a pulsating direct current voltage;

a voltage reducing circuit electrically coupled with the rectifier circuit and operable to reduce the voltage of the pulsating direct current voltage and to output a reduced direct current voltage associated with the pulsating direct current voltage;

a dimmer circuit electrically coupled with the voltage reducing circuit for receiving the reduced direct current voltage therefrom, and operable to detect from the reduced direct current voltage occurrence of an interruption to the pulsating direct current voltage and to generate a dimmer signal corresponding to detected occurrence of the interruption to the pulsating direct current voltage; and a driver module electrically coupled with the lighting appliance, the rectifier circuit and the dimmer circuit and operable to modulate a duty cycle of the pulsating direct current voltage based on the dimmer signal to generate a pulse width modulated signal that is provided to the lighting appliance for driving the lighting appliance to generate light with an intensity corresponding to the dimmer signal.

Another object of the present invention is to provide a driving device for a lighting appliance.

According to another aspect of the present invention, a driving device comprises:

a rectifier circuit operable to rectify an input alternating current signal and to output a pulsating direct current voltage;

a voltage reducing circuit electrically coupled with the rectifier circuit and operable to reduce the voltage of the pulsating direct current voltage and to output a reduced direct current voltage associated with the pulsating direct current voltage;

a dimmer circuit electrically coupled with the voltage reducing circuit for receiving the reduced direct current voltage therefrom, and operable to detect from the reduced direct current voltage occurrence of an interruption to the pulsating direct current voltage and to generate a dimmer signal corresponding to detected occurrence of the interruption to the pulsating direct current voltage; and a driver module electrically coupled with the rectifier circuit and the dimmer circuit and operable to modulate a duty cycle of the pulsating direct current voltage based on the dimmer signal to generate a pulse width modulated signal that is provided to the lighting appliance for driving the lighting appliance to generate light with an intensity corresponding to the dimmer signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
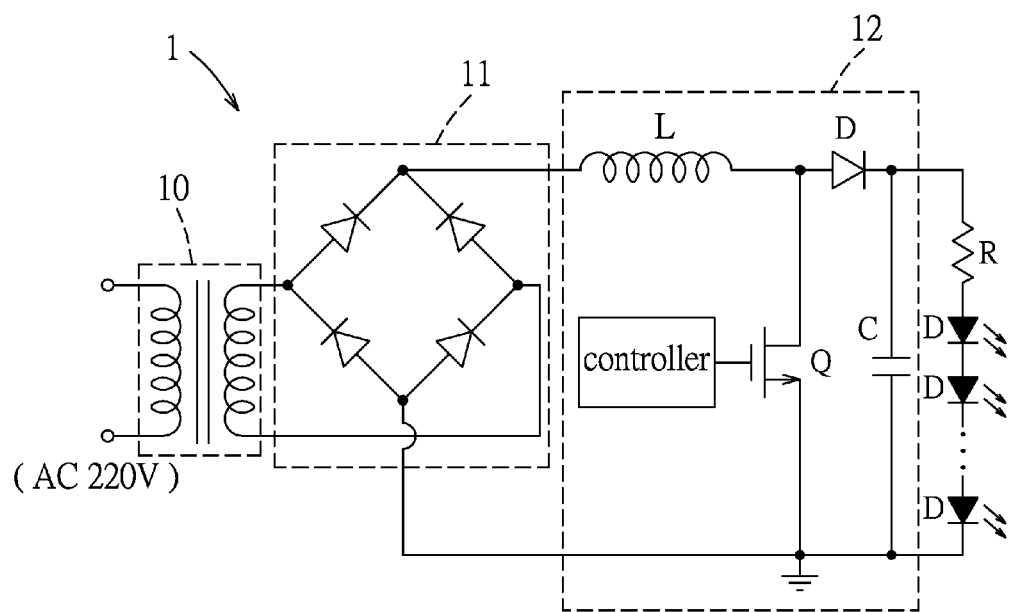
FIG. 1 is a schematic circuit diagram of a conventional driving circuit for a light emitting diode tube lamp.
Figure 2:
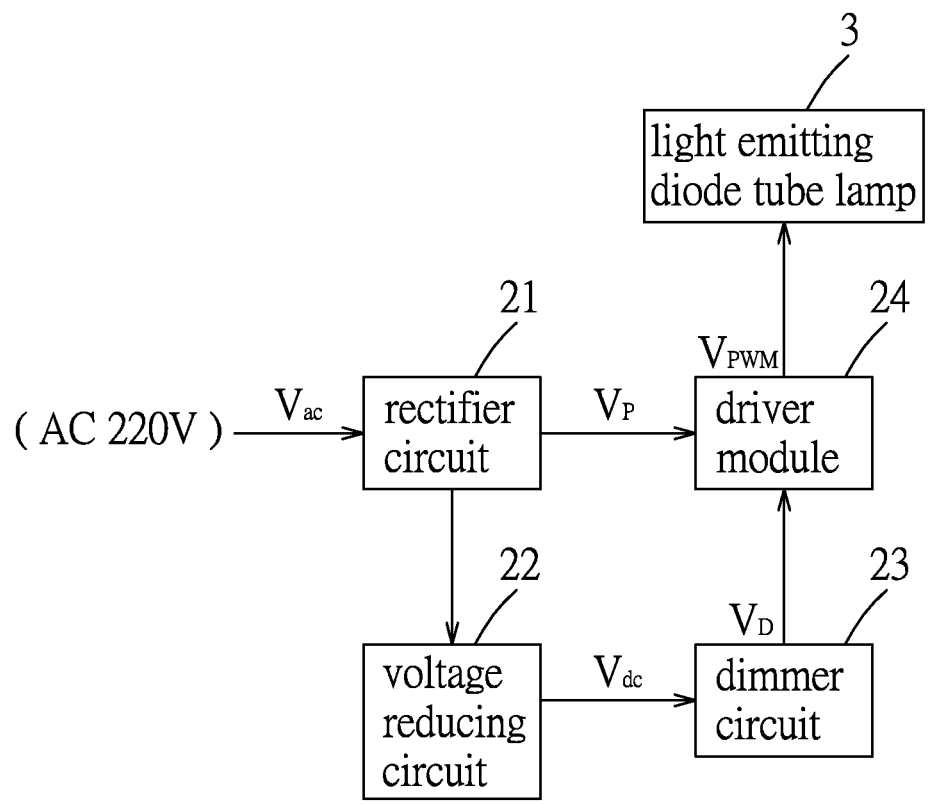
FIG. 2 is a schematic block diagram of a driving device for a light emitting diode tube lamp in a preferred embodiment of the present invention.
Figure 3:
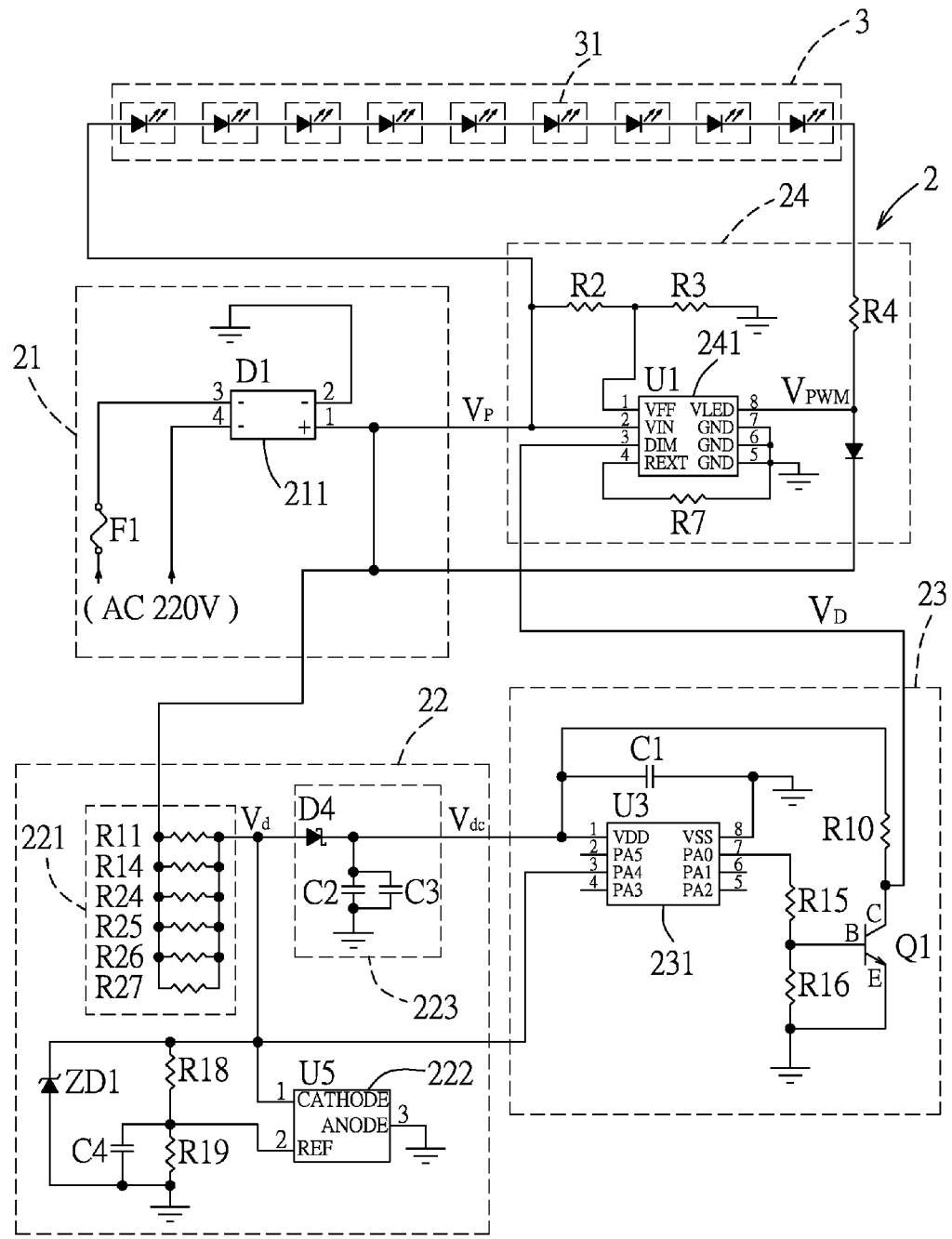
FIG. 3 is a schematic circuit diagram of the driving device for the light emitting diode tube lamp in the preferred embodiment of the present invention.

Referring to FIGS. 2 and 3, a preferred embodiment of a driving device 2 for a lighting appliance is used for driving a light emitting diode tube lamp 3. The light emitting diode tube lamp 3 includes a plurality of light emitting diode strings 31 electrically connected in series, and each of the light emitting diode strings 31 includes a plurality of light emitting diode dies (not shown) electrically connected in series. In this preferred embodiment, the light emitting diode tube lamp 3 includes nine light emitting diode strings 31, and each of the light emitting diode strings 31 includes eight light emitting diode dies. In other embodiments, the number of the light emitting diode string 3 may range from 2 to 12, and the number of light emitting diode dies included in each light emitting diode string 31 may range from 2 to 8.

The driving device 2 includes a rectifier circuit 21, a voltage reducing circuit 22 electrically coupled with the rectifier circuit 21, a dimmer circuit 23 electrically coupled with the voltage reducing circuit 22, and a driver module 24 that is electrically coupled with the light emitting diode tube lamp 3, the rectifier circuit 21 and the dimmer circuit 23 and that drives the light emitting diode tube lamp 3 to generate light. The rectifier circuit 21 includes a bridge rectifier 211 for rectifying an input alternating current signal Vac (such as AC 110V), and outputs a pulsating direct current voltage Vp to the voltage reducing circuit 22 and the driver module 24.

The voltage reducing circuit 22 reduces and converts the pulsating direct current voltage Vp to a direct current power voltage Vdc. In this preferred embodiment, the voltage reducing circuit 22 includes a current limiting circuit 221 electrically coupled with the rectifier circuit 21, and a linear regulator 222 and a filter circuit 223 electrically coupled with the current limiting circuit 221. The current limiting circuit 221 includes a plurality of resistors in this embodiment, but may include only one resistor in other embodiments. The voltage of the pulsating direct current voltage Vp outputted from the rectifier circuit 21 is reduced by the current limiting circuit 221 to result in a reduced direct current voltage Vd associated with the pulsating circuit current voltage Vp. The linear regulator 222 operates to stabilize the reduced direct current voltage Vd, and the filter circuit 223 filters the reduced direct current voltage Vd and outputs the direct current power voltage Vdc (about 5V) to the dimmer circuit 23.

The dimmer circuit 23 includes a controller 231 having a power pin VDD for receiving the direct current power voltage Vdc, and a detect pin PA4 electrically coupled with the current limiting circuit 221. The controller 231 (such as a microcontroller) detects from the reduced direct current voltage Vd occurrence of an interruption to the pulsating direct current voltage Vp. The controller 231 is operable to generate a dimmer signal $V_D$ corresponding to detected occurrence of the interruption to the pulsating direct current voltage Vp. Commonly, a two-state switch (not shown in the Figures) is used for controlling provision of the alternating current signal Vac to the driving device 2. Each occurrence of the interruption to the pulsating direct current voltage Vp is defined as the two-state switch disconnecting from and connecting with the alternating current signal Vac within a predetermined time period (such as 2-3 seconds).

In this embodiment, the driving device 2 controls the light emitting diode tube lamp 3 to switch among three dimming modes. After the driving device 2 receives an input alternating current signal Vac, the controller 231 operates in a first dimming mode to generate a dimmer signal $V_D$ having a first duty cycle, which can be a previous duty cycle at a time point prior to prolonged interruption of the input alternating current signal Vac to the driving device 2. When the controller 231 detects an occurrence of the interruption to the pulsating direct current voltage Vp while operating in the first dimming mode, the controller 231 switches operation to a second dimming mode and generates the dimmer signal Vd having a second duty cycle. When the controller 231 detects another occurrence of the interruption to the pulsating direct current voltage Vp while operating in the second dimming mode, the controller 231 switches operation to a third dimming mode and generates the dimmer signal Vd having a third duty cycle. Furthermore, when the controller 231 detects yet another occurrence of the interruption to the pulsating direct current voltage Vp while operating in the third dimming mode, the controller 231 switches operation back to the first dimming mode, such that the dimmer signal $V_D$ transitions sequentially among the first, second and third duty cycles. Specifically, an ON time of the first duty cycle is greater than an ON time of the second duty cycle, which is greater than an ON time of the third duty cycle.

In this embodiment, the driver module 24 includes a constant-current driver circuit 241 that receives the pulsating direct current voltage Vp from the rectifier circuit 21 and the dimmer signal $V_D$ from the dimmer circuit 23. The constant-current driver circuit 241 modulates, based on the dimmer signal Vd, the duty cycle of the pulsating direct current voltage Vp to generate a pulse width modulated signal $V_{pwm}$ for driving the light emitting diode dies of the light emitting diode strings 31 to generate light. In this embodiment, when the dimmer signal $V_D$ has the first duty cycle, the pulse width modulated signal $V_{pwm}$ generated by the constant-current driver circuit 241 drives the light emitting diode strings 31 to emit a first light intensity. When the dimmer signal $V_D$ has the second duty cycle, the pulse width modulated signal $V_{pwm}$ generated by the constant-current driver circuit 241 drives the light emitting diode strings 31 to emit a second light intensity. When the dimmer signal $V_D$ has the third duty cycle, the pulse width modulated signal $V_{pwm}$ generated by the constant-current driver circuit 241 drives the light emitting diode strings 31 to emit a third light intensity. The first light intensity is greater than the second light intensity, which is greater than the third light intensity. These light intensities correspond to different levels of light dimming of the light emitting diode tube lamp 3.

In this embodiment, the driving device 2 does not include a transformer, which accordingly effectively reduces the weight and dimensions of the driving device 2. Furthermore, a power factor correction circuit is not required in the absence of a transformer, such that the problem of an electrolytic solution drying up in an electrolytic capacitor in a power factor correction circuit maybe avoided, prolonging the lifespan of the driving device 2.

Figure 4:
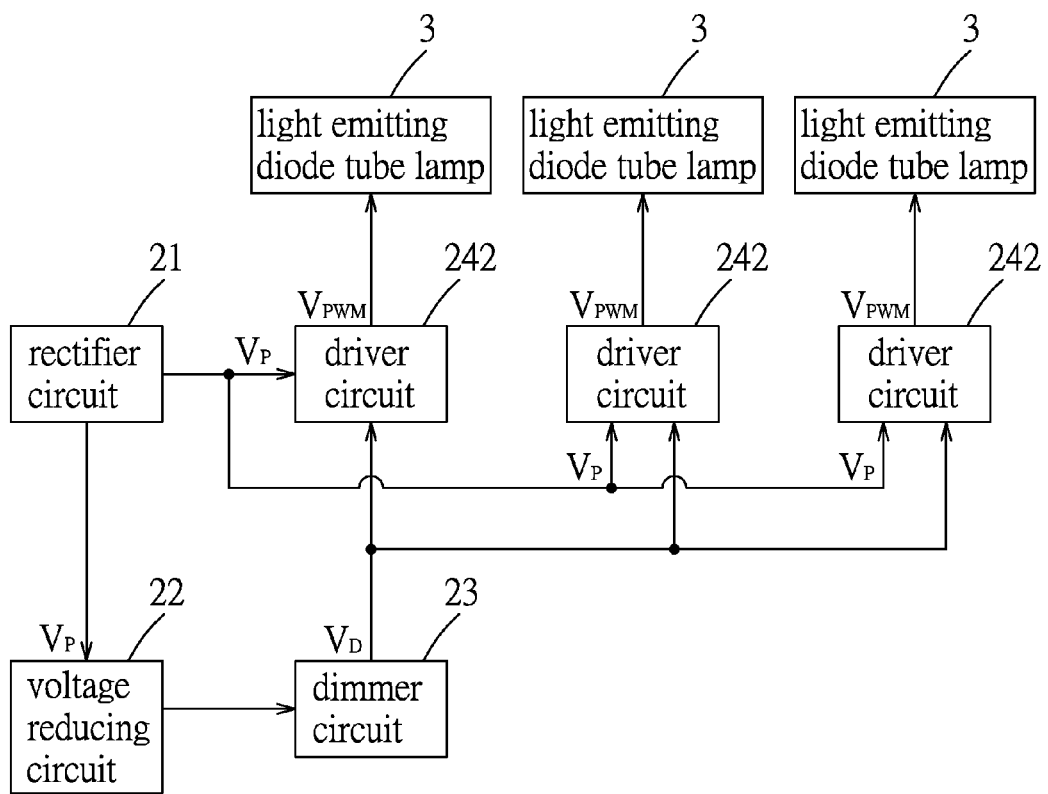
FIG. 4 is a schematic block diagram showing a modification of the preferred embodiment, in which a plurality of driver circuits are included in a driver module.

Referring to FIG. 4, embodiment modified driving device 2 of the present invention is shown to include a plurality of driver circuits 242. Each of the driver circuits 242 is electrically coupled to a corresponding light emitting diode tube lamp 3 and to the rectifier circuit 21 and the dimmer circuit 23. Each of the driver circuits 242 operates to provide the pulse width modulated signal $V_{pwm}$ to the corresponding one of the tube lamps 3. The constant-current driver circuit 241 (see FIG. 3) in each of the driver circuits 242 modulates, based on the dimmer signal Vd, the duty cycle of the pulsating direct current voltage Vp to generate a pulse width modulated signal $V_{pwm}$ for driving the light emitting diode dies of the light emitting diode strings 31 of the corresponding one of the tube lamps 3 to generate light with an intensity corresponding to the duty cycle of the dimmer signal $V_D$.

In summary, the driving device 2 of this invention has a voltage reducing circuit 22 that replaces a transformer, effectively reducing the weight and dimensions of the driving device 2. Furthermore, since a power factor correction circuit is not required in the absence of a transformer, the problem of an electrolytic solution drying up in an electrolytic capacitor in a power factor correction circuit is thus avoided, thereby prolonging the lifespan of the driving device 2. Moreover, based on an occurrence of interruption to an input power detected by the dimmer circuit 23, the driver module 24 controls a light intensity of the light emitting diode tube lamp 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lighting system comprising a lighting appliance, and a driving device that includes:
 a rectifier circuit operable to rectify an input alternating current signal and to output a pulsating direct current voltage;
 a voltage reducing circuit electrically coupled with the rectifier circuit and operable to reduce the voltage of the pulsating direct current voltage and to output a reduced direct current voltage associated with the pulsating direct current voltage;
 a dimmer circuit electrically coupled with the voltage reducing circuit for receiving the reduced direct current voltage therefrom, and operable to detect from the reduced direct current voltage occurrence of an interruption to the pulsating direct current voltage and to generate a dimmer signal corresponding to detected occurrence of the interruption to the pulsating direct current voltage; and a driver module electrically coupled with the lighting appliance, the rectifier circuit and the dimmer circuit and operable to modulate a duty cycle of the pulsating direct current voltage based on the dimmer signal to generate a pulse width modulated signal that is provided to the lighting appliance for driving the lighting appliance to generate light with an intensity corresponding to the dimmer signal.

2. The lighting system as claimed in claim 1, wherein the voltage reducing circuit includes a current limiting circuit electrically coupled with the rectifier circuit, and a linear regulator and a filter circuit electrically coupled with the current limiting circuit, the voltage of the pulsating direct current voltage being reduced by the current limiting circuit to result in the reduced direct current voltage, the linear regulator being operable to stabilize the reduced direct current voltage, the filter circuit filtering the reduced direct current voltage and outputting a direct current power voltage to the dimmer circuit.

3. The lighting system as claimed in claim 2, wherein the current limiting circuit includes at least one resistor.

4. The lighting system as claimed in claim 1, wherein the dimmer circuit includes a controller operable to detect from the reduced direct current voltage occurrence of the interruption to the pulsating direct current voltage and to generate the dimmer signal corresponding to detected occurrence of the interruption to the pulsating direct current voltage.

5. The lighting system as claimed in claim 1, wherein the driver module includes a constant-current driver circuit operable to modulate the duty cycle of the pulsating direct current voltage based on the dimmer signal.

6. The lighting system as claimed in claim 1, wherein the lighting appliance is a light emitting diode tube lamp including a plurality of light emitting diode strings electrically connected in series, each of the light emitting diode strings including a plurality of light emitting diode dies electrically connected in series.

7. The lighting system as claimed in claim 6, wherein the light emitting diode tube lamp includes a first number (M) of the light emitting diode strings and each of the light emitting diode strings includes a second number (N) of the light emitting diode dies, $2 \leq M \leq 12$, $2 \leq N \leq 8$.

8. The lighting system as claimed in claim 1, wherein the lighting appliance includes a plurality of tube lamps, and the driver module includes a plurality of driver circuits, each being electrically coupled to a corresponding one of the tube lamps and to the rectifier circuit and the dimmer circuit, each of the driver circuits being operable to provide the pulse width modulated signal to the corresponding one of the tube lamps.

9. The lighting system as claimed in claim 1, wherein the dimmer circuit is configured to operate in a plurality of dimming modes, each of which is associated with a corresponding duty cycle of the dimmer signal, and when the dimmer circuit detects occurrence of the interruption to the pulsating direct current voltage while operating in one of the dimming modes, the dimmer circuit switches operation to another one of the dimming modes and generates the dimmer signal having the duty cycle corresponding to said another one of the dimming modes.

10. A driving device for a lighting appliance, comprising:
a rectifier circuit operable to rectify an input alternating current signal and to output a pulsating direct current voltage;
a voltage reducing circuit electrically coupled with the rectifier circuit and operable to reduce the voltage of the pulsating direct current voltage and to output a reduced direct current voltage associated with the pulsating direct current voltage;
a dimmer circuit electrically coupled with the voltage reducing circuit for receiving the reduced direct current voltage therefrom, and operable to detect from the reduced direct current voltage occurrence of an interruption to the pulsating direct current voltage and to generate a dimmer signal corresponding to detected occurrence of the interruption to the pulsating direct current voltage; and
a driver module electrically coupled with the rectifier circuit and the dimmer circuit and operable to modulate a duty cycle of the pulsating direct current voltage based on the dimmer signal to generate a pulse width modulated signal that is provided to the lighting appliance for driving the lighting appliance to generate light with an intensity corresponding to the dimmer signal.

11. The driving device as claimed in claim 10, wherein the voltage reducing circuit includes a current limiting circuit electrically coupled with the rectifier circuit, and a linear regulator and a filter circuit electrically coupled with the current limiting circuit, the voltage of the pulsating direct current voltage being reduced by the current limiting circuit to result in the reduced direct current voltage, the linear regulator being operable to stabilize the reduced direct current voltage, the filter circuit filtering the reduced direct current voltage and outputting a direct current power voltage to the dimmer circuit.

12. The driving device as claimed in claim 11, wherein the current limiting circuit includes at least one resistor.

13. The driving device as claimed in claim 10, wherein the dimmer circuit includes a controller operable to detect from the reduced direct current voltage occurrence of the interruption to the pulsating direct current voltage and to generate the dimmer signal corresponding to detected occurrence of the interruption to the pulsating direct current voltage.

14. The driving device as claimed in claim 10, wherein the driver module includes a constant-current driver circuit operable to modulate the duty cycle of the pulsating direct current voltage based on the dimmer signal.

15. The driving device as claimed in claim 10, the lighting appliance including a plurality of tube lamps, wherein the driver module includes a plurality of driver circuits, each being electrically coupled to the rectifier circuit and the dimmer circuit and being operable to provide the pulse width modulated signal to a corresponding one of the tube lamps.

16. The driving device as claimed in claim 10, wherein the dimmer circuit is configured to operate in a plurality of dimming modes, each of which is associated with a corresponding duty cycle of the dimmer signal, and when the dimmer circuit detects occurrence of the interruption to the pulsating direct current voltage while operating in one of the dimming modes, the dimmer circuit switches operation to another one of the dimming modes and generates the dimmer signal having the duty cycle corresponding to said another one of the dimming modes.

* * * * *